United States Patent [19]

Heindl et al.

[11] Patent Number: 4,853,597
[45] Date of Patent: Aug. 1, 1989

[54] RAPID RESTRIKE METAL HALIDE LAMP AND A METHOD OF OPERATING SUCH

[75] Inventors: Raymond A. Heindl, Euclid; Gilbert H. Reiling, Chardon; Albert L. Suster, Chagrin Falls, all of Ohio

[73] Assignee: General Electric Company, Schenectady, N.Y.

[21] Appl. No.: 114,467

[22] Filed: Oct. 30, 1987

Related U.S. Application Data

[62] Division of Ser. No. 47,082, May 5, 1987, Pat. No. 4,723,097.

[51] Int. Cl.$^4$ .................. H01J 61/18; H01J 61/36; H01J 7/24
[52] U.S. Cl. .................................. 313/638; 313/15; 313/623
[58] Field of Search ............... 313/638, 639, 640, 641, 313/642, 623, 624, 547, 13, 15, 17, 25, 26, 27, 28

[56] References Cited

U.S. PATENT DOCUMENTS 3,590,306  6/1971  Burnham et al. .................. 313/17 X Primary Examiner—David Mis
Attorney, Agent, or Firm—John P. McMahon; Stanley C. Corwin; Fred Jacob

[57] ABSTRACT

A rapid restrike metal halide lamp and method of operating such a lamp are disclosed which are particularly suitable for sports stadium lighting applications. The rapid restrike metal halide lamp has an arc tube containing constituents which require a waveform having a relatively high voltage and at a relatively high current in order to rapidly restrike the arc tube after the lamp has experienced a power interruption so as to initiate a sustaining arc condition of the arc tube. The relatively high waveform in the form of a series of pulse trains is routed to the arc tube by means of a two path arrangement comprising a conductive base at the bottom of the lamp and a insulative cap at the top of the lamp. This two-way path substantially reduces and even eliminates any arcing condition within the confines of the lamp. The rapid restrike metal halide lamp may have a keep-alive heater arranged around at least a portion of the arc tube so as to assist in the rapid restriking of the lamp after the lamp has experienced an extended shut-down or cool-down condition. The disclosed method specifies particular ranges for an ignition voltage which obtain the rapid restrike of the arc tube.

4 Claims, 2 Drawing Sheets

RAPID RESTRIKE METAL HALIDE LAMP AND A METHOD OF OPERATING SUCH

This is a division of application Ser. No. 047,082, filed May 5, 1987, now U.S. Pat. No. 4,723,097.

BACKGROUND OF THE INVENTION

This invention relates to metal halide lamps, and more particularly, to rapid restrike metal halide lamps and method of operating such lamp which are particularly suitable for sport stadium lighting applications.

Standard metal halide lamps having an arc tube disposed therein and containing constituents, typically require a relatively long duration such as 10 to 15 minutes, in which the power may be reapplied to the arc tube to initiate or restrike its arc condition following any power interruption to the lamp which caused the extinction of arc conditions of such a previously operating lamp. Such metal halide lamps suffer a disadvantage in certain lighting systems such as those employed in sport stadiums. For example, if the lighting system of the sports stadium experiences a power outage, it is desired that the initiation or restrike of the arc tube be attempted within a few seconds, rather than 10 to 15 minutes, so that the sporting activity being performed can be resumed within a relatively short time and observed by those people at the stadium and also those that may be viewing the event on television.

Metal halide lamps that allow for this restrike condition require a starting or ignition waveform of a relatively high voltage at a relatively high current level from external circuitry in order to initiate a desired ionization condition of the constituents within the arc tube. To accommodate this type of starting or restrike waveform, the metal halide lamp itself must be provided with sufficient insulation and spacing between the conductive members within the lamp carrying this restrike waveform so that arcing therebetween does not occur within the lamp itself. It is desired that a metal halide lamp be provided which accepts this type of starting waveform without the need to resort to excessive insulation within the lamp so as to safeguard against any related arcing condition in the lamp.

The metal halide lamp having the rapid restrike capability should also take into account the requirements of the external circuitry supplying the lamp. The metal halide lamp should present to such external circuitry a load having a relatively low stray capacitance so that such circuitry may be able to develop the desired starting waveforms at a periodic repetition rate without experiencing undue transmission losses.

Accordingly, it is an object of the present invention to provide a rapid restrike metal halide lamp that accepts a starting waveform of a relatively high voltage at a relatively high current level from external circuitry without the need of excessive insulation within the lamp and also present a relatively low stray capacitance load to the external circuitry.

SUMMARY OF THE INVENTION

This invention is directed to a rapid restrike metal halide lamp and method of operating such a lamp which are particularly suited for sport stadium lighting applications.

The rapid restrike metal halide lamp comprises a light transmissive envelope, a base attached to the outer envelope with a stem having an inlead appropriately connected to the base, and a cap attached to the outer envelope having an inlead appropriately connected thereto and extending therefrom into the outer envelope. The cap has insulating means extending into the outer envelope and enclosing the inlead. The metal halide lamp further comprises support means comprising an upper member and a lower member for rigidly supporting and axially aligning an arc tube within the outer envelope. The lower member is electrically connected to the inlead within the stem. The arc tube contains a fill comprising an inert gas, mercury metal, and a halide compound. The arc tube has a pair of thermionic electrodes sealed in opposite ends thereof with one of the electrodes being electrically connected to the lower support member and the other of the electrodes being electrically connected to the inlead of the cap and insulated from the upper support member. The arrangement of the inleads which are connected to the arc tube presents a relatively low stray capacitance to the external circuitry operating the lamp.

The method of operating the rapid restrike metal halide lamp comprises the steps of applying a starting or ignition waveform having the characteristics of a pulse train with a frequency of at least 25 Hz and with each pulse train having an amplitude of at least 50 kilovolts and comprised of a series of approximately exponentially decaying high frequency oscillations typically at 5 MHz. The method preferably continues the application of the ignition waveform until the constituents within the arc tube are placed into a condition that initiates a self-sustaining arc condition.

DETAILED DESCRIPTION OF THE PREFERRED EMBODIMENTS

Figure 1:
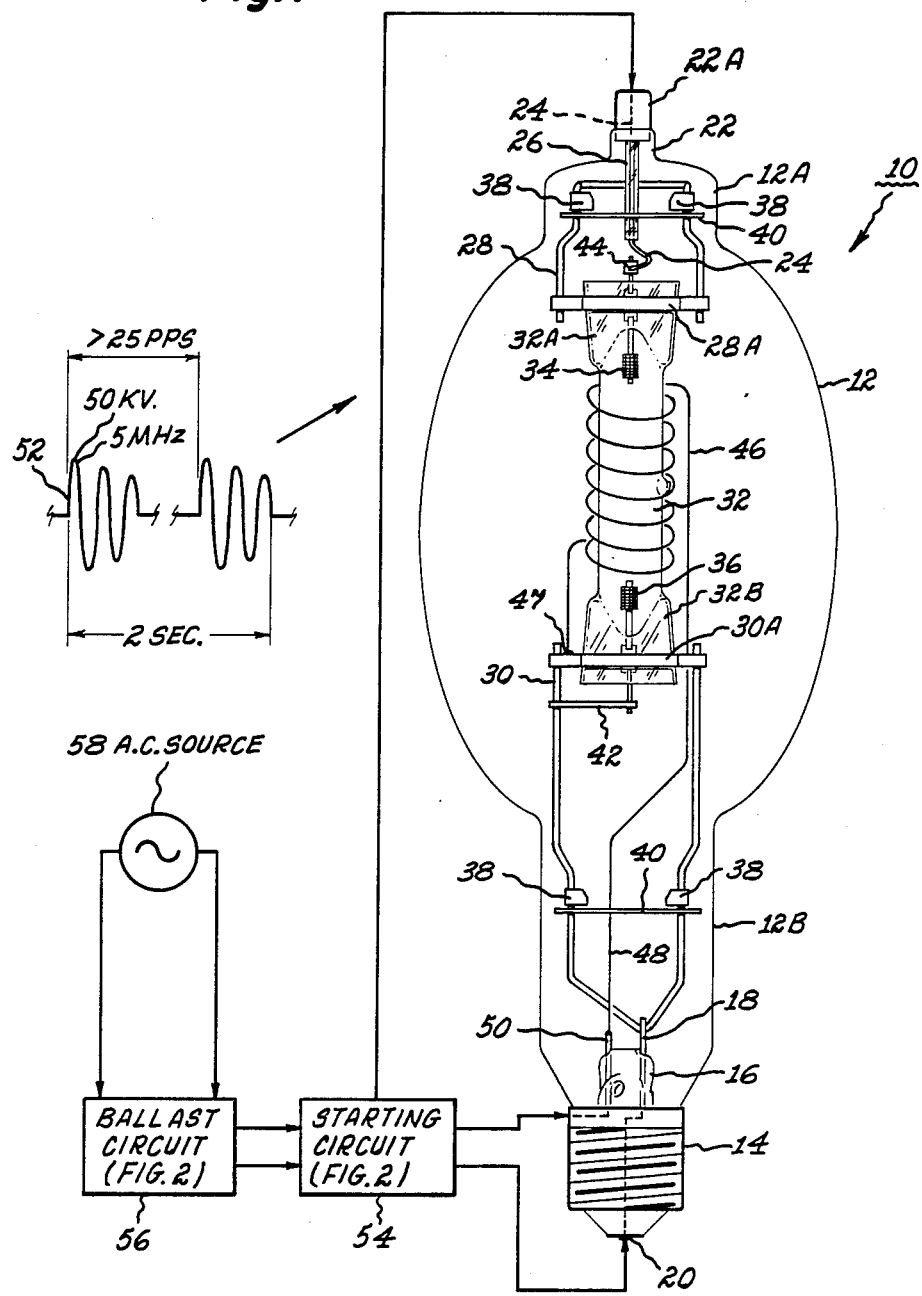
FIG. 1 illustrates a rapid restrike metal halide lamp and its associated external starting and ballast circuits with the starting circuit providing a starting or ignition waveform in accordance with one embodiment of the present invention.

FIG. 1 illustrates a rapid restrike metal halide lamp 10 in accordance with one embodiment of the present invention along with a general illustration of the starting circuit and ballast circuit interconnected to the lamp 10. The lamp 10 has various applications such as emergency lighting and is particularly suited for sports stadium lighting systems.

The rapid restrike metal halide lamp 10 comprises a generally ellipsoidal shaped light-transmissive outer envelope 12 having a dome section 12A and a neck section 12B. The lamp 10 further comprises a conductive base portion 14 attached to the outer envelope 12 and having a stem 16 which has embedded therein an inlead 18 that is appropriately connected to the central contact portion 20 of the base 14. The lamp 10 further has a cap 22 having an upper portion 22A formed of an iron-nickel-cobalt alloy such as Kovar which is a trademark of the Carborundum Company. The cap 22 has an inlead 24 appropriately connected thereto and extending therefrom into the outer envelope 12. The cap further has insulating means 26 formed of a quartz or glass material which extends into the outer envelope 12 and encloses the inlead 24.

The lamp 10 further has support means comprising an upper member 28 and a lower member 30 for rigidly supporting and axially aligning an arc tube 32 having a pair of thermionic electrodes 34 and 36 sealed in opposite ends thereof. The arc tube is physically connected to member 28 by means of a member 28A strapped around one of pinched portion 32A and to member 30 by means of a member 30A strapped around its other pinched portion 32B. The means for axially aligning and centering the arc tube within the outer envelope is provided by a plurality of braces 38 which abut against and are positionable about the inner walls of the outer envelope 12. The centering means 38 are attached to the support members 28 and 30 by appropriate means such as welding.

The lamp 10 preferably has first and second heat shields 40 respectively positioned onto the lower and upper member and respectively located above and below the opposite pinch portions 32A and 32B of the arc tube 32. The first heat shield reduces the temperature at cap 22 and also redirects the light output from lamp 10 from upper end portion to its central portion. Similarly, the second beat shield reduces the temperature at the base of lamp 10 and also redirects the light output of lamp 10 from its lower end portion to its central portion.

The electrode 36 of the arc tube 32 is electrically connected to inlead 18 by means of a conductive member 42 along with the lower support means 30. The electrode 34 of arc tube 32 is electrically connected to the inlead 24 by means of an electrical junction member 44 welded to the electrode 34.

The lamp 10 also preferably has a keep-alive heater 46 formed of a wire coiled about substantially all but at least a portion of the arc tube 32 and having a first end 47 connected to the lower brace member 30 by means of the strapped member 30A. The keep alive heater 46 has a second end 48 which is appropriately connected to the electrically conductive base 14 by means of an inlead 50 embedded in the stem 16.

The arc tube 32 has constituents comprising an inert gas such as xenon or argon, a mercury vapor in the range of about 21 mg to about 165 mg effected to establish an A.C. operating voltage for said arc tube in the range of about 130 volts to about 270 volts, and a halide compound which develops a vapor pressure during the operating of the lamp 10. The halide is preferably selectable from the group consisting of (1) sodium iodide, scandium iodide, thorium iodide, cadmium iodide and mixtures thereof, (2) sodium iodide, scandium iodide, thorium iodide, cadmium iodide, mixtures of the selected halide, and the metal cadmium additive to the selected halide and to the mixture of the selected iodides, and (3) the metal cadmium.

As discussed in the "Background" section it is desirable that a metal halide lamp be provided with (1) the capability of rapidly restriking within a short duration such as two seconds, (2) means for reducing the necessary insulation between related conductive members within the lamp that are connected to the external circuitry which develops the relatively high voltage and a high current level required for the rapid restrike of the lamp, and (3) presents a relatively low stray capacitance to the electrical circuits that provides the necessary voltage and current conditions to start, restrike and run the metal halide lamp. The capability to start and rapidly restrike the arc tube is provided, in part, by the application of waveform 52 of FIG. 1 developed by the starting circuit 54 to be described hereinafter. The present invention provides a metal halide lamp having minimum insulation by advantageously positioning its conductive members (inleads 24 and 18) Within lamp 10. The advantageous stray capacitance is provided by the arrangement of the upper portion of lamp 10.

The rapid restrike metal halide lamp 10 provides a two-way path for routing the conductive members carrying an ignition waveform developed by the starting circuit 52 and placed across the arc tube 32 so as to substantially eliminate any arcing condition therebetween. The two-way path is provided by having one of the conductive members routed into the lamp 10 by means of the inlead 18 located at the bottom of the lamp 10 and the other conductive member routed into the lamp 10 by means of inlead 24 located at the top of the lamp 10. The two-way path allows for a spacing such as approximately six (6) inches between its conductive members so as to substantially eliminate any arc condition therebetween. The greater separation between the conductive members, relative to routing both of the conductive members into either the top or the bottom of the lamp, provides sufficient isolation between the conductive members so as to prevent arcing therebetween.

A further feature of the present invention related to the low stray capacitance of lamp 10 is provided by means of the cap 22 and its related interconnecting components. This low stray capacitance important at the high frequency operation of starting circuit 54 is provided by isolating the inlead 24 from any of the other electrically conductive members of lamp 10 such as the upper member 28 and its interconnected members such as its heat shield 40, centering means 38 and strap member 28A. The inlead 24 is provided with such isolation by means of insulating member 26 formed of quartz or glass material and selected so as to have high resistivity at high temperature, and ability to withstand thermal shock which is a high stress condition caused by rapid temperature changes which might otherwise cause the insulating member to break or rupture. Further, the low stray capacitance of lamp 10 is preferably provided by the relative small size of cap 22 and by minimizing the length of the inlead 24 within lamp 10.

The cap 22 further provides an upper seal arrangement by means of its upper portion 22A formed of the iron-nickel-cobalt alloy such as Kovar TM, having extra strength over other materials, and allowing the inlead 24 to be sealed therein without exiting from the outer envelope 14. An advantage of the cap seal 22 is that the large surface of cap 22 provides extra strength, relatively to a single wire connection, for supporting a high voltage lead from the external circuitry operating the lamp 10. Alternatively, the sealing may be accomplished by fusing a tungsten wire into the dome section of the outer envelope glass. This tungsten wire would be a part of the inlead wire assembly and would closely match the thermal expansion coefficient of the outer envelope glass.

The lamp 10 having this low stray capacitance primary provided by cap 22 and lead insulation 26, advantageously allows for the external circuitry, in particular, the starting circuit 54, generally shown in FIG. 1, to supply to lamp 10 an ignition waveform or voltage 52 also shown in FIG. 1. The lamp 10 is operated in a manner, after experiencing a power interruption for a period sufficient to extinguish the arc, so as to initiate a restrike condition by providing an ignition voltage 52 having a sufficient amplitude, duration, and repetition rate so that all of the constituents within the arc tube 32 are sufficiently ionized within a typical two second period after such power interruption so as to initiate a self-sustaining arc condition of the arc tube 32.

Figure 2:
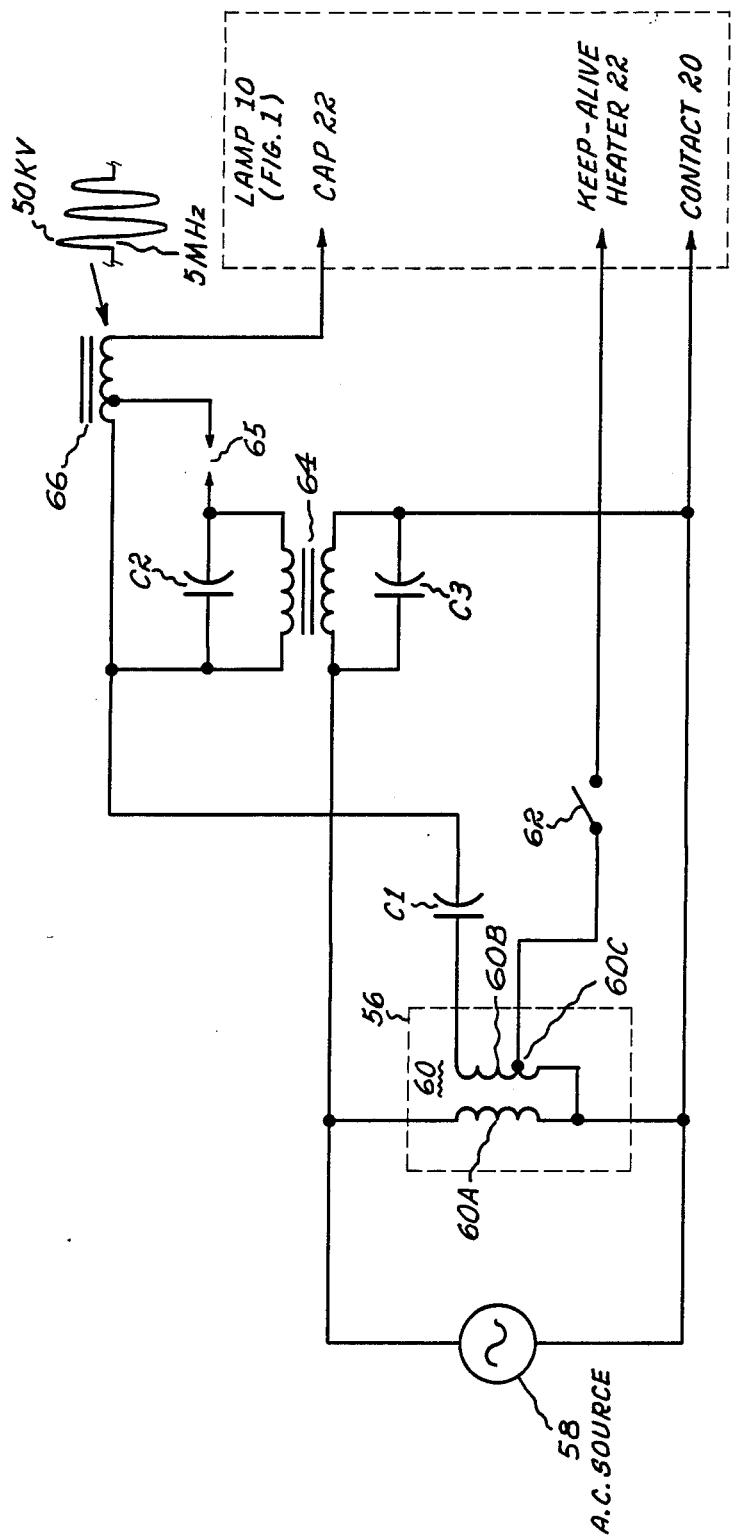
FIG. 2 is a schematic illustrating the starting and ballast circuits related to supplying the necessary conditions to the rapid restrike metal halide lamp of the present invention.

The ignition voltage 52 is supplied by a starting circuit 54, to be described with regard to FIG. 2, which has as its input stage a ballast circuit 56 which is connected to an A.C. source 5B having a typical voltage of 120 volts to 480 volts at a frequency of 50 to 60 Hz. The starting circuit 54 develops the ignition voltage 52 which is preferably comprised of a train of pulses having a repetition rate of at least 25 Hz with each of the pulse train having an amplitude of about 50 kilovolts. The pulse train comprises a series of approximately exponentially decaying high frequency oscillations, typically about 5 MHz. The ignition voltage 52 has a typical duration of two seconds. The ignition voltage 52 may be continuously supplied to the arc tube 32 until the constituents of the arc tube establish an ionization condition that provides a self-sustaining arc.

The keep alive heater 46 wrapped around substantially all or even part of the arc tube 32 may also be supplied with a current for heating the arc tube 32. Such heating assists in the rapid restrike of the arc tube 32 in those cases in which the arc tube 32 experiences a relatively long shut-down or cool-down periods of greater than one minute. Alternatively, a tin oxide coating on a shroud which is auxiliary to the arc tube 32 may serve as the keep-alive heater 46. The interconnections of the keep-alive circuit related to the starting circuit 54 along with the ballast circuit 56 are shown in FIG. 2.

The ballast circuit 56 is comprised of a ballast transformer 60 having a primary winding 60A connected across the A.C. source 58. The transformer 60 further has a secondary winding 60B. The ballast circuit 56 supplied the necessary voltage and current conditions to sustain he arc condition of the lamp 10 after such conditions have been established by the starting circuit 54. The ballast circuit 56 may be of the type described in U.S. Pat. No. 3,781,586 of Johnson, herein incorporated by reference,, and to which may be referred for further details of the operation of such ballast circuit.

A portion of the secondary winding 60B, shown as 60C, is routed to an supplies an appropriate voltage, such as 5 to 10 volts to the keep-alive heater 46. A switch 62 may be placed in series between the transformer 60 and the keep-alive heater 46 so that the heater 46 may be turned-off after the lamp 10 has reached its pperating or turned-on condition initiated by starting circuit 54.

The starting circuit 54 may comprise an capacitor C1 for impedance matching purposes related to the A.C. source 58. This capacitor C1 may also be considered as relating to the ballast circuit 56. The starting circuit 54 further comprises a transformer 64, capacitors C2 and C3 having typical respective values of 1000 and 0.1 picofarads, a spark gap device 65 such as two electrodes or wires spaced apart by a predetermined distance, and a step-up transformer 66 having a portion of its winding connected to spark gap device 65.

In general, the starting circuit 54 operates such that transformer 64 and capacitor C2 applies increasing voltage across spark gap device 64 until spark gap device 65 conducts causing the discharge of the charged capacitor C2 into high voltage transformer 66. Transformer 66 being a step-up transformer provides a high frequency high voltage starting pulse train of ignition signal 52 to the lamp. The frequency of such a train 52 is established the resonance circuit of transformer 64 and capacitor C2. Such a starting circuit 54 is designed to provide at least 0.02 joules to the lamp at a repetition rate of at least greater than 25 pulses per second (pps). The starting circuit 54 supplies such a signal 52 during the initial starting of lamp 10 and during the restrike conditions after the lamp 10 has experienced any power interruptions as previously described in he "Background" section.

The starting circuit 54 preferably continues the application of the ignition signal 52 until an ionization starting or restrike condition of arc tube 32 is established so as to yield a self-sustaining arc light output of lamp 10. The starting circuit 54 recognizes the self sustaining arc condition by the impedance of the lamp transitioning from a high state to a low state. Upon sensing this transition the starting circuit 54 effectively removes itself from the lamp 10 and allow the ballast circuit 56 to supply and regulate the necessary voltage and current conditions for the maintaining the operation of the lamp 10. The effective removal of the starting circuit 54 from lamp 10 may be accomplished in such a manner as described in U.S. Pat. No. 4,099,095 of Turner, herein incorporated by reference, and to which may be referred to for further details of such operation.

It should now be appreciated that the practice of the present invention provides for a rapid restrike metal halide lamp in which the constituents within the arc tube of the metal halide lamp are sufficiently ionized within a relatively short time, such as two seconds, to provide a self-sustaining arc. It should further be appreciated that the metal halide lamp of the present invention by means of its two-way path provides a lamp having increased isolation requirements between the conductive members which route the relatively high voltage and current ignition waveform across the arc tube of the metal halide lamp to start and rapidly restrike such an arc tube after the lamp has experienced power interruption condition. Further, it should be appreciated that the metal halide lamp having the cap arrangement 22 presents a relatively low stray capacitance to the starting circuit thereby allowing easier starting and less of a load that is presented to the starting circuit.

What we claim as new and desire to secure by Letters Patent of the United States is:

1. A rapid restrike metal halide lamp comprising:
   (a) a light-transmissive outer envelope;
   (b) a base attached to said outer envelope with a stem having an inlead appropriately connected to said base;
   (c) a cap attached to said outer envelope having an inlead appropriately connected thereto and extending therefrom into said outer envelope, said cap having insulating means extending into said outer envelope and enclosing its inlead;
   (d) support means comprising an upper and a lower member for rigidly supporting and axially aligning an arc tube within said outer envelope, said lower member being electrically connected to said inlead of said stem;
   (e) said arc tube containing a fill comprising an inert gas, mercury metal and a halide compound, said arc tube having a pair of thermionic electrodes sealed in opposite ends thereof, one of said electrodes being electrically connected to said lower support member and the other of said electrodes being electrically connected to said inlead of said cap and insulated from said upper support member.

2. A rapid restrike metal halide lamp according to claim 1 wherein said insulating means of said cap is selected to have high resistivity at relatively high temperatures and the ability to withstand thermal shock.

3. A rapid restrike metal halide lamp according to claim 1 further comprising;
   (a) a first and a second heat shield respectively positioned onto said lower and said upper members of said support means and respectively located above and below said opposite ends of said arc tube.

4. A rapid start metal halide lamp according to claim 1 further comprising;
   (a) a keep-alive heater formed of a wire coiled around at least a portion a said arc tube and having a first end connected to said lower member of said support means and a second end appropriately connected to said base by electrical connection means.

* * * * *